(No Model.)
R. F. DULANY.
HOLDBACK FOR VEHICLES.
No. 404,035. Patented May 28, 1889.
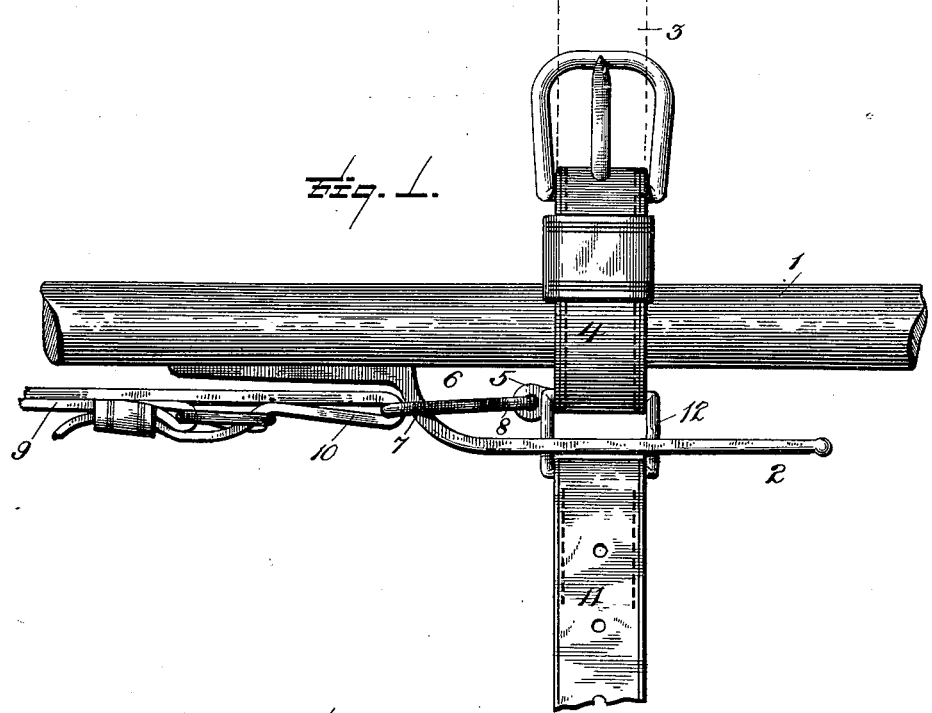
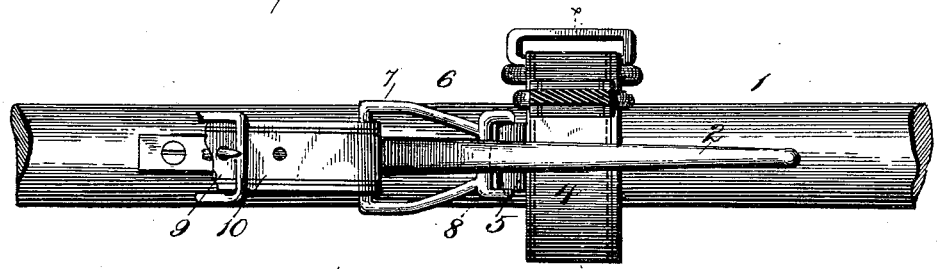
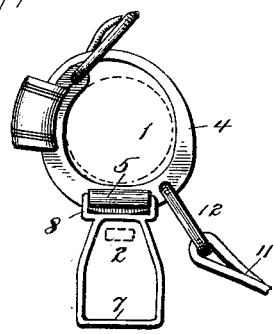
Witnesses:
L. C. Hills
W. S. Duvall
Inventor.
R. F. Dulany
E. B. Stocking
Attorney.

UNITED STATES PATENT OFFICE.

ROLAND F. DULANY, OF WAYNESBURG, PENNSYLVANIA.

HOLDBACK FOR VEHICLES.

SPECIFICATION forming part of Letters Patent No. 404,035, dated May 28, 1889.

Application filed February 28, 1889. Serial No. 301,464. (No model.)

*To all whom it may concern:*

Be it known that I, ROLAND F. DULANY, a citizen of the United States, residing at Waynesburg, in the county of Greene, State of Pennsylvania, have invented certain new and useful Improvements in Holdbacks, of which the following is a specification, reference being had therein to the accompanying drawings.

This invention has relation to holdbacks, and among the objects in view are to provide a simple and effective holdback which by its peculiar arrangement greatly simplifies the operation of hitching, and will automatically uncouple with the shafts when the traces are disconnected from the singletree.

Other objects and advantages of the invention will hereinafter appear, and the novel features will be particularly pointed out in the claims.

Referring to the drawings, Figure 1 is a side elevation of a thill, the back-strap, and holdback, the three being arranged in operative position. Fig. 2 is a bottom plan of the same. Fig. 3 is a section on line $x\,x$ of back-strap.

Similar numerals of reference refer to similar parts in all the figures of the drawings.

1 represents the thill or shaft, to the under surface of which is secured a prong or hook, 2, the open end of which is toward the forward end of the shaft or thill.

3 represents the back-strap, which, as is usual, is provided with a depending thill-receiving loop, 4, projecting rearwardly, from the lower end of which is a loop, 5, in which is connected one end of a coupling, 6, having opposite D-shaped eyes, 7 and 8, the former serving as means for connecting the loop 5 thereto and for the passage of the prong 2, all as clearly shown in Fig. 1.

9 represents the breeching-strap, at the two terminals of which are formed loops 10, which are adapted for connection with the rearwardly-projecting prong-receiving eye 7 of the metallic coupling 6, said eye being preferably formed in D shape, and thereby designed for the accommodation of the strap-loop 10.

By the construction described it is apparent that in hitching a horse the thills 1 are inserted through the loops 4 in the usual manner until they are on about a line with the forward ends of the prongs 2, when the eyes are looped over their respective prongs. The traces are now connected to the singletree and the hitching is complete. In unhitching it simply remains to disconnect the traces with the singletree and the horse is at liberty to walk out from between the shafts or thills, the eyes 7 easily slipping from off the prong.

When the parts are in position, it is apparent that by reason of the double-eyed coupling 6 all strain from the breeching is maintained by the breeching, its connecting-eye 7, and the prong, which is formed with a rear wall, against which the draft comes in holding back, thus relieving the remainder of the harness from any strain whatever.

Having described my invention and its operation, what I claim is—

1. In a holdback, a pair of thills provided with prongs upon their under surface, in combination with a back-strap terminating in loops for receiving the thills and provided with rearward strap-loops having a double-eyed metallic coupling, and a holdback-strap or breeching terminating in opposite loops and connected with one of the eyes of the coupling, substantially as specified.

2. The shaft 1, having the prong 2, in combination with the back-strap 3, terminating in the thill-receiving loops 4, having the end loops, 5, the metallic couplings 6, having the opposite eyes, 7 and 8, the latter connected with the loops 5 and the former passing over the prong 2, and the holdback-strap 9, having the opposite loops 10, connected with the eyes 7, substantially as specified.

In testimony whereof I affix my signature in presence of two witnesses.

ROLAND F. DULANY.

Witnesses:
   JAS. M. HOGE,
   ARCHIE T. HUPP.